(12) United States Patent
Martin et al.

(10) Patent No.: US 7,294,806 B2
(45) Date of Patent: Nov. 13, 2007

(54) METHOD AND DEVICE FOR MEASURING AND ADJUSTING THE ELECTRODE FOR TAPER MACHINING ON AN ELECTRICAL DISCHARGE MACHINE

(75) Inventors: François Martin, Peillonnex (FR); Friedhelm Altpeter, Susten (CH)

(73) Assignee: Charmilles Technologies SA, Meyrin (CH)

( * ) Notice: Subject to any disclaimer, the term of this patent is extended or adjusted under 35 U.S.C. 154(b) by 2 days.

(21) Appl. No.: 11/346,057

(22) Filed: Feb. 2, 2006

(65) Prior Publication Data

US 2006/0219667 A1    Oct. 5, 2006

(30) Foreign Application Priority Data

Mar. 30, 2005    (EP)    ................................. 05007377

(51) Int. Cl.
*B23H 7/06*    (2006.01)

(52) U.S. Cl. .................................................. 219/69.12

(58) Field of Classification Search ............. 219/69.12; 33/502; 700/162
See application file for complete search history.

(56) References Cited

U.S. PATENT DOCUMENTS

| | | | |
|---|---|---|---|
| 4,559,601 A | 12/1985 | Kishi et al. | |
| 4,736,086 A | 4/1988 | Obara | |
| 4,931,614 A | 6/1990 | Sumita | |
| 5,003,147 A | 3/1991 | Kawanabe et al. | |
| 5,006,691 A | 4/1991 | Nakayama | |
| 5,095,635 A * | 3/1992 | Iwasaki ........................ | 33/644 |
| 6,612,043 B2 * | 9/2003 | Tsai et al. ................ | 219/69.12 |
| 6,836,741 B2 * | 12/2004 | Liang et al. ............. | 219/69.17 |
| 2002/0184777 A1 | 12/2002 | Tsai et al. | |
| 2004/0030440 A1 | 2/2004 | Murai et al. | |

FOREIGN PATENT DOCUMENTS

| | | |
|---|---|---|
| CH | 690 420 | 9/2000 |
| JP | 58126025 | 7/1983 |

* cited by examiner

*Primary Examiner*—Geoffrey S. Evans
(74) *Attorney, Agent, or Firm*—Bachman & LaPointe, P.C.

(57) ABSTRACT

A device and method for measuring and adjusting an electrode used during electrical discharge taper machining, referenced on three axes, Y and Y horizontal and Z vertical, whereas two linear geometric references, bottom and top, which may be intersected by a wire, each of them lying in a plane XY, the references being offset from one another in a direction XY by a sufficient distance to make it possible to insert a vertical electrode between the two without either of them being intersected by the wire, a base element serving as a support to the references and as an attachment stay on the work bed of the machine.

9 Claims, 4 Drawing Sheets

METHOD AND DEVICE FOR MEASURING AND ADJUSTING THE ELECTRODE FOR TAPER MACHINING ON AN ELECTRICAL DISCHARGE MACHINE

BACKGROUND OF THE INVENTION

The present invention relates to a measurement and adjustment device and method applied to a wire-based tool-electrode which is inclined relative to a main direction in an electrical discharge machine. Such a machining method commonly called taper machining is widely used in the field of wire electrical discharge machines. These machines are usually fitted with a plane on which the piece to be machined is attached or work table plane; with a bottom wire-guide movable in a plane XY parallel to the work table plane; with a top wire-guide movable in a plane UV also parallel to the work table plane. The top guide may moreover be moved along a fifth axis Z perpendicular to the work table plane. The electrode is stretched between the two wire-guides with a sufficient mechanical load for it to approach a rectilinear shape in the active portion. The two wire-guides move under the guidance of a numerical control programmed to construct ruled surfaces from the most basic to the most complex, which the machine can produce with precisions of the order of a few microns. The active portion of the wire electrode is similar to a rectilinear cylinder with a diameter of approximately 0.01 to 0.3 mm and a length that may extend from a few mm to 50 cm as an example.

In document U.S. Pat. No. 4,559,601, there is a description of the typical issues to be addressed by taper machining processes. In case of taper angle variations during machining, the trajectory followed by the bottom guide in the plane XY is different from the trajectory followed by the top guide in the plane UV; the one is not deduced simply from the other. In summary, the correlated management of travel on one or other of these two trajectories requires an exact knowledge of the position Z of each of the guides relative to the work table plane. In this document, the assumption is made that the axis of the wire is similar to a rectilinear segment stretched between two pinpoint guides. Such a simplification was rapidly seen to be inadequate in matters of precision machining. As will be explained hereinafter, account must be taken of the mechanical stresses which deform the wire in the vicinity of the guides so as to delimit the rectilinear active portion thereof that is in practice usable for machining.

Document U.S. Pat. No. 4,736,086 helps to understand how the trajectories imposed on each of the two guides by the numerical control must be corrected so that the final geometry of the machined piece is correct. For this purpose, offsets which take account notably of the machining gap, the radius of the wire, its inclination, the movement of the resting (contact) point of the wire caused by the rounded shape of the guides at the output, etc. are applied to the desired final shape on the piece. In particular, the movement of the resting (contact) point of the wire on the guide as a function of its inclination is computed therein on the assumption that the guides trap the wire with a clearance close to zero, are of perfect axial geometry and comprise a well known output radius—all things that are not easy to obtain in practice due to the difficulties and high costs of ensuring tight tolerances during the production of these small-dimensioned guide members in sapphire or diamond.

On the other hand, the same document describes why, due to its rigidity, the wire does not perfectly conform to the roundness of the guide and teaches how to compute an additional correction with the aid of a model of the bending of the wire in the elastic domain in which in particular the mechanical load applied to the wire, its moment of inertia, its modulus of elasticity, etc. come into play. The weakness of such a model is that it assumes the mechanical load to be constant despite the variations in inclination and in the unwinding speed of the wire. Furthermore, the clearance in the guides has to be known in advance and must remain constant despite wear.

The invention does still require the provision of measurement cycles in order to calibrate and recalibrate certain parameters of the model. In addition, experience has shown that it is easy to obtain a sufficiently regular axis-symmetric shape of the wire-guides. On the other hand, obtaining a constant wire guide output radius is much more difficult. Therefore, it is impossible to predict the actual height of the pivot point with the aid of a model when the angle of inclination of the wire varies.

Document CH 690 420 deals with the use of closed guides having an axial symmetry and used to machine with large taper angles of the wire. The document describes the stresses inflicted on the wire when it leaves the top guide and abruptly changes direction. These stresses may cause the wire to enter the domain of plastic deformations. The invention teaches which minimal radius to give to the guide so that the wire does not transport any plastic deformations in its active portion. When the wire unwinds from top to bottom, the plastic deformations caused by the bottom guide do not have to be taken into account. The precautions recommended in the document are used to ensure (see FIG. 1) that the wire 1 is similar to a rectilinear cylindrical segment 6 of small diameter stretched between two pivot points $W_1$, $W_2$, one being close to the bottom guide 2 and the other to the top guide 4. The problem is then limited to identifying the heights $Z_{w1}$, $Z_{w2}$ of the said pivot points, thus making it possible with the aid of well known computation methods, to determine the corrections applicable to the trajectories of the guides 2 and 4.

More particularly, document CH 690 420 teaches how to use automatic measurement cycles to determine the heights $Z_{w1}$, $Z_{w2}$ with the aid of an eyepiece 8 (see FIG. 2). The wire searches for the center of said eyepiece at two heights of the top wire-guide $Z_{min}$ and $Z_{max}$. At the height $Z_{min}$ the wire is inclined in a first direction by an angle $\beta$, then at the height $Z_{max}$ it is inclined in a second opposite direction by an angle $\alpha$ which would be required to be equal to $\beta$ so that the proposed formula gives an exact result. Unfortunately with this method, to ensure that $\alpha=\beta$, it would be necessary to know the exact heights of the guides and those of the pivot points; in FIG. 2, the latter are represented as coinciding with the guides. Because of this inadequate knowledge, the procedure therefore begins with approximate data which is corrected progressively during several iterations of the computation. The wasted time is acceptable if one or two inclinations of the wire are to be calibrated; however, if it is necessary to prepare a machining process comprising many taper angle values, the complete cycle of the iterations must be repeated for each wire inclination value, hence a considerable waste of time.

There are other disadvantages to add to the lack of effectiveness of the method for multi-angle calibrations:

the base plane of the measurement eyepiece must first be set parallel to the work table plane;

the wire must first be set perpendicular to the work table plane;

the center of the eyepiece must, at each step, be again identified by a series of approaches in crossed directions;

it is necessary to determine whether the approaches take place on the top edge of the eyepiece or on its bottom edge;

at the beginning, the inadequate knowledge of the exact heights of the guides and of the pivot points brings risks of collisions with the eyepiece, related to the vertical movements of the Z axis.

All these factors imply that the measurement method is not very reliable, unnecessarily complex and costly in execution time.

Finally, for the method in question to be acceptable, it has to be assumed that the guides have a perfect axis-symmetric shape and that their axis of symmetry is parallel to the direction Z. At a certain level of precision, such a hypothesis must be abandoned for at least two reasons. Firstly, nothing guarantees (see FIG. 3) that the axes of symmetry 3 and 5 of the guides are parallel to Z. The axis Z' of FIG. 3 represents the position of the wire ideally set perpendicular to the work table plane or parallel to the axis Z. Then the two machining contacts 15 and 16 transmit through the guides a defect that tends to deviate the wire out of alignment in its active portion, thus altering the position of the pivot points $W_1$, $W_2$. This shows the value of identifying the pivot points not only as a function of the inclination $\Delta UV$ of the wire but also, for each value $\Delta UV$, as a function of the direction in the plane UV of the said inclination; the term $\overrightarrow{\Delta UV}$ will be used hereinafter to designate an inclination of the wire oriented in a plane UV.

FIG. 4 illustrates a similar method routinely used, which is mentioned for example in documents U.S. Pat. No. 5,003,147 or U.S. Pat. No. 5,006,691 and which uses a mechanical gauge device comprising two reference abutments 7, 8 placed one above the other, exactly aligned in a plane perpendicular to the work table plane and of which the exact height difference H is known. By inclining the wire in one direction and then the other relative to its vertical position, one or the other of these reference abutments is contacted.

The operation usually proceeds in 7 steps marked from <1a> to <7a> in FIG. 4.

Step <1a>: the wire is set perfectly perpendicular to the work table plane.

Step <2a>: the wire is brought into contact with the two abutments 7 and 8. The position $xy_1$ reached is measured and stored.

Step <3a>: return to approximately the position <1a> to be able to incline the wire without risk of collision.

Step <4a>: the wire is inclined towards the left by making a movement $-\Delta UV$.

Step <5a>: the wire is brought into contact with the abutment 8. The position $xy_3$ reached is measured and stored.

Step <6a>: the wire is inclined towards the right by making a movement $+\Delta UV$ from its vertical position.

Step <7a>: the wire is brought into contact with the abutment 7. The position $xy_2$ reached is measured and stored.

If the wire is vertical at the beginning of the operation, then the triangles JKL and IKM are similar and it is possible to compute the distances $D_1$ and $D_2$ which will be used to ascertain the height of each of the two pivot points relative to the work table plane. These results $D_1$ and $D_2$ obtained by three approaches at <2a>, <5a> and <7a> depend a priori only on the accuracy of the approaches against the two reference abutments and on the accuracy of the dimension H; these accuracies are routinely of the order of a micron. However, when the wire is close to the vertical, it is not possible to determine with certainty whether the two reference abutments contact the wire at the same time or only one or the other. Accordingly, it is necessary to install the measurement device truly perpendicular to the work table plane, to set the wire parallel to the two reference abutments as well as perpendicular to the work table plane. These operations are still lengthy and tricky. It is therefore again necessary to take account of the uncertainties relating to the latter to assess the accuracy of the results and correct them. Finally, as in the preceding device and method, the wire has to be inclined in two opposite directions to compute the heights of the pivot points tied to an inclination value $\Delta UV$. This is acceptable provided only that each of the two guides comprises a perfect axial symmetry as already mentioned hereinabove.

SUMMARY OF THE INVENTION

The object of the present invention is to overcome the weaknesses and avoid the disadvantages of the known methods explained hereinabove by proposing a method and a device that are easier to use and make it possible to rapidly log a series of inclination measurements of a wire in several directions of the plane UV.

The invention is based on the following two observations.

First, when the wire is close to the vertical position, the pivot points $W_1$, $W_2$ coincide with the ideal line which joins the centers of the two wire-guides, which justifies the use for the computation of similar triangles ABC, QRU and QST characteristic of FIG. 6. The approximation is valid up to a limit of 1 degree from the vertical for relatively rigid steel wires. For softer, copper-based wires for example, this limit will be situated at 5 degrees. In this way, it becomes possible to dispense with the need to begin the measurements with a perfectly vertical wire and the results become insensitive to the uncertainties of verticality of the wire at the beginning.

Then, knowing the height of the pivot points $W_1$, $W_2$ is equivalent to determining the point of intersection between two straight lines which become practically parallel when the taper angle tends towards zero; for example, determining the height of the point of intersection $W_2$ between the axis of the segment 6 of FIG. 1 and the vertical 5. At about 2 degrees of inclination of the segment 6, the uncertainty concerning the knowledge of the height of the pivot points $W_1$, $W_2$ is of the order of a tenth of a millimeter. In principle, this uncertainty tends towards infinity when the angle tends towards zero. However, for angles of less than 1.7 degrees, this uncertainty causes an inaccuracy of less than 3 microns measured parallel to the work table plane.

BRIEF DESCRIPTION OF THE DRAWINGS

The embodiments of the invention will be described with reference to the figures:

FIG. 3 shows how to incline the wire in all the directions of the plane UV.

DETAILED DESCRIPTION

Figure 5:
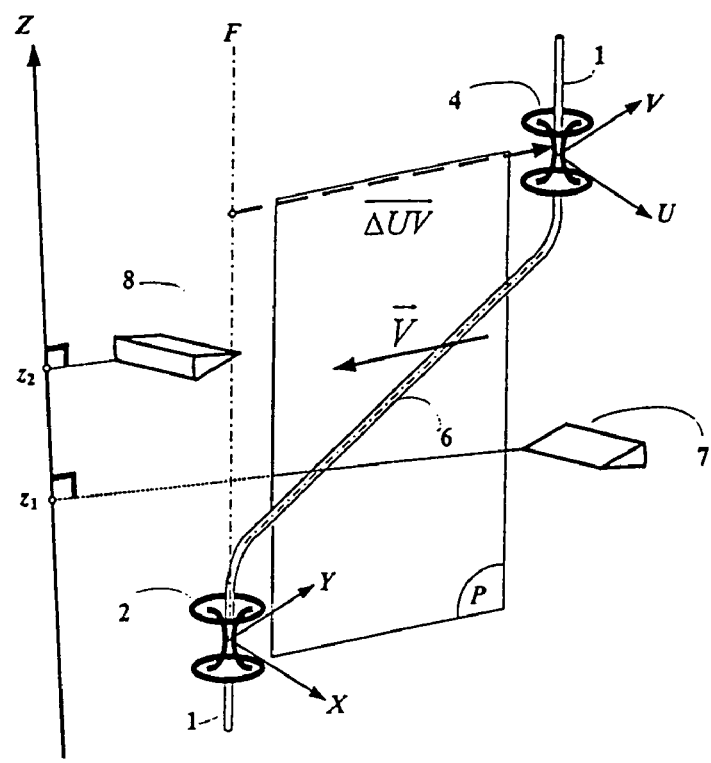
FIG. 5, similar to FIGS. 1 and 3, briefly illustrates the elements constituting the invention.

To understand the invention, the main elements, real or virtual, illustrated by FIG. 5 must be considered; they are:
 a bottom wire-guide 2 movable in a plane of coordinates XY,
 a top wire-guide 4 movable on the one hand in a plane of coordinates UV parallel to XY; this same wire-guide 4 may on the other hand be moved in a vertical direction Z, the heights indicator and perpendicular to the planes XY and UV,
 a plane P defined by the axis F which symbolizes the real position of the wire at the beginning close to the vertical, and by the inclination vector $\overrightarrow{\Delta UV}$; this plane P is intended to contain the axis of the inclined rectilinear section 6 (active portion) of the wire intended for machining with different taper angle values,
 two linear reference abutments (7, 8) each of them in a plane XY with two different known heights $z_1$, $z_2$. The two linear abutments are offset from one another in a direction XY so that it is possible to insert the vertical wire between the two without contacting one or the other.

The wire may then successively and separately contact one or other linear abutment during a single movement $\overrightarrow{V}$ in the plane P; this movement may be made separately by one or simultaneously by both wire-guides. By simultaneous movement of both guides, it must be understood that each of them makes the same movement and at the same time.

Placing the wire between the two linear abutments makes it possible, as will be seen hereinafter, to run through the various steps of the procedure with a speed that the methods known in the prior art do not achieve. This performance results from the ability to bring these linear abutments closer to one another in a direction XY which makes it possible to shorten the movements to the minimum and hence to save execution time.

Figure 6:
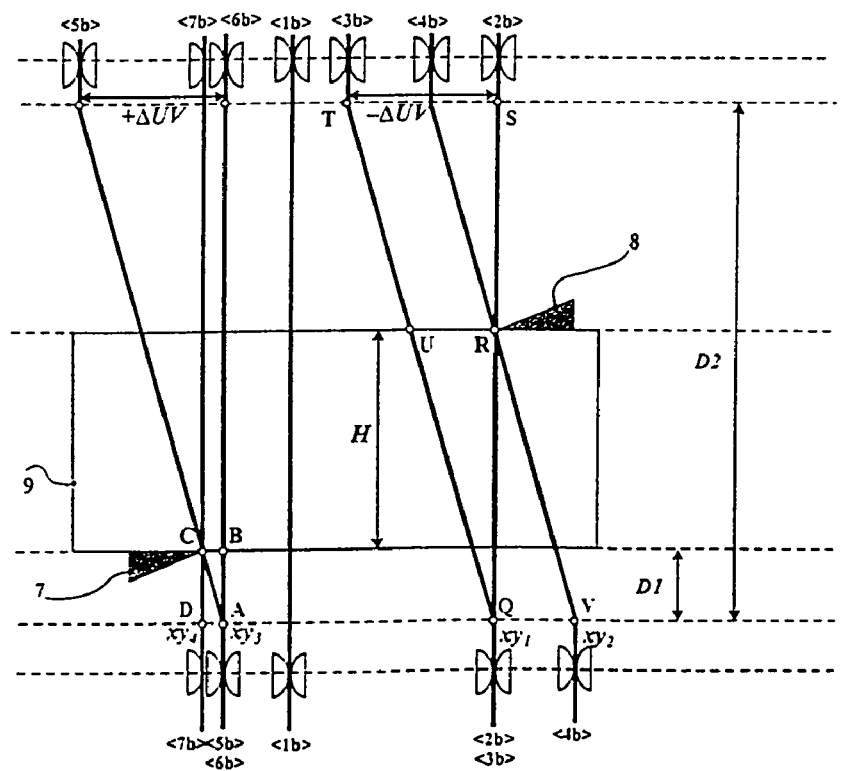
FIG. 6 is a flat projection of all the movements of the wire during the operations of measurement and adjustment that are part of a first embodiment of the invention.

With the aid of FIG. 6, we will describe in detail a first embodiment of the invention. FIG. 6 is a projection onto the plane P of the movements of the wire during the measurement and adjustment operations. The device used consists of a simple rectified metal block 9 of height H known with precision. It is essential that the top and bottom faces of this block are parallel and that the block is gripped with no clearance on the work table plane. The two linear abutments 7 and 8, respectively placed one at the height of the bottom face, the other at the height of the top face of the block 9, are supported by two rigid beveled bases attached to the block 9, the said linear abutments 7 and 8 extending at the outside of the block 9 towards the front of the figure. No particular precaution needs to be taken to install these abutments 7 and 8, except that it must be possible to insert the approximately vertical wire between one and the other, so that it contacts neither one nor the other of the two linear abutments, so that it can make contact with one or other separately by a single movement and that the point of contact is at the height of one or other of the parallel faces of the block 9.

The operation proceeds in 7 steps marked <1b> to <7b> in FIG. 6.

Step <1b>: the wire close to the vertical is brought between the two linear abutments so that it is in contact with neither one nor the other.

Step <2b>: by a simultaneous movement of the guides, the wire is brought into contact with the top linear abutment 8. The position $xy_1$ reached is measured and stored.

Step <3b>: by a separate movement of the top guide 4, the wire is inclined towards the bottom linear abutment 7 by making a movement $-\Delta UV$.

Step <4b>: by a simultaneous movement of the guides, the wire is brought back into contact with the top linear abutment 8. The position $xy_2$ reached is measured and stored.

Step <5b>: by a simultaneous movement of the guides, the wire is brought into contact with the bottom linear abutment 7. The position $xy_3$ reached is measured and stored.

Step <6b>: by a separate movement of the top guide 4, the wire is brought back towards the vertical position by making a movement $+\Delta UV$.

Step <7b>: by a simultaneous movement of the guides, the wire is brought back into contact with the bottom linear abutment 7. The position $xy_4$ reached is measured and stored.

Figure 4:
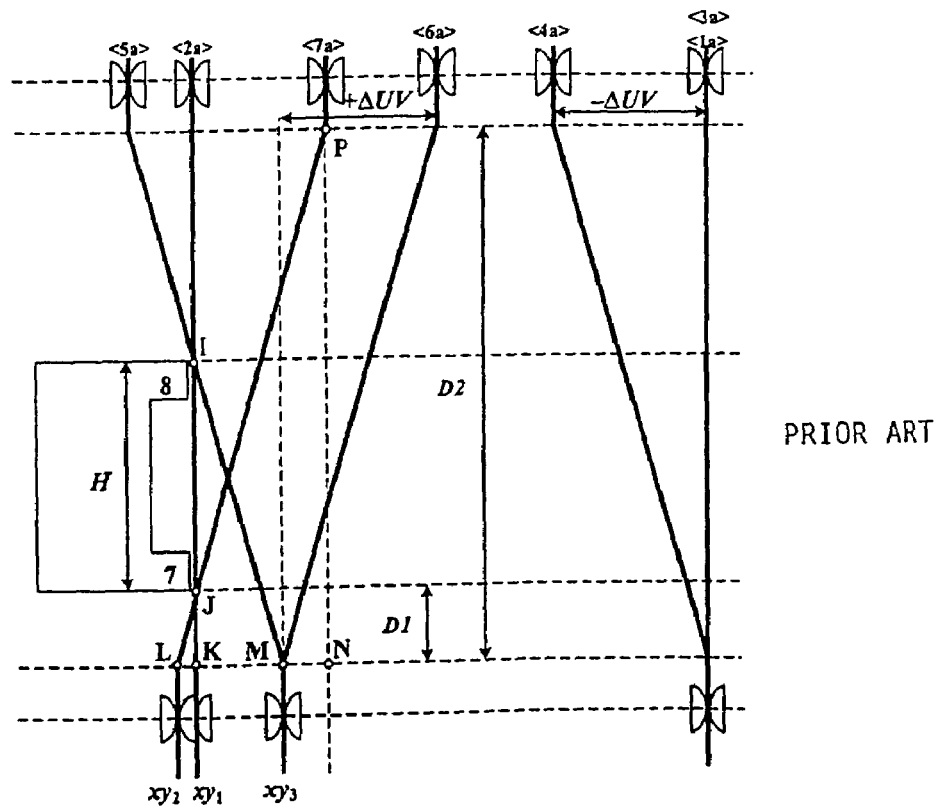
FIG. 4 illustrates another method of the prior art and its mechanical gauge device, which necessitate a perfectly vertical wire at the beginning of the measurements.

During the preparatory phase described hereinabove, 4 approaches have been made. This may seem less efficient than the method illustrated in FIG. 4 where 3 approaches are necessary. It will be seen hereinafter that during the running of a series of increasing inclinations, 2 approaches are sufficient for each value of inclination.

The purpose of the operation is to compute the distances $D_1$ and $D_2$ which will be used to ascertain the heights $Z_{w1}$, $Z_{w2}$ of each of the two pivot points $W_1$, $W_2$ relative to the work table plane.

By observing the similar triangles ABC and QRU and the parallelograms ABCD and QURV it follows that:
  $BC/D_1 = UR/(D_1+H)$ is equivalent to:

$$\frac{\|xy_3 - xy_4\|}{D_1} = \frac{\|xy_2 - xy_1\|}{D_1 + H}$$

From which can be derived:

$$D_1 = H \frac{\|xy_3 - xy_4\|}{\|xy_2 - xy_1\| - \|xy_3 - xy_4\|}$$

It should be remembered here that these operations are possible because, in <2b> <6b> <7b> the wire being close to the vertical position, the pivot points $W_1$, $W_2$ coincide with the ideal line which joins the centers of the two wire-guides.

By observing the similar triangles QRU and QST it follows that:
UR/($D_1$+H)=TS/$D_2$ is equivalent to:

$$\frac{\|xy_2 - xy_1\|}{D_1 + H} = \frac{\Delta UV}{D_2}$$

From which can be derived:

$$D_2 = \frac{(D_1 + H)\Delta UV}{\|xy_2 - xy_1\|}$$

Then the process continues with a series of increasing inclinations by repeating only steps <2b><3b><4b><5b> according to the following simplified model, the positions $xy_1$ and $xy_4$ remaining unchanged:

Step <2b>: by a simultaneous movement of the guides, the wire is brought into contact with the top linear abutment 8.

Step <3b>: by a separate movement of the guide 4, the wire is inclined more sharply towards the bottom linear abutment 7 by making a movement $-\Delta UV$ greater than the previous one.

Step <4b>: by a simultaneous movement of the guides, the wire is brought back into contact with the top linear abutment 8. A new position $xy_2$ reached is measured and stored.

Step <5b>: by a simultaneous movement of the guides, the wire is brought into contact with the bottom linear abutment 7. A new position $xy_3$ reached is measured and stored.

Corresponding to each new value of inclination $\Delta UV$, the computations of $D_1$ and $D_2$ are made according to the above formulae.

The reader will note that in step <2b>, at the beginning, by a simultaneous movement of the guides, the choice is to bring the wire into contact with the top linear abutment 8 and not with the bottom linear abutment 7. This choice is evidently not necessary. Contacting the bottom linear abutment 7 in step <2b> evidently leads to a similar sequence of movements which will not be given in detail in order to simplify the explanation.

The results table below was obtained in less than 10 minutes and illustrates a series of measurements taken with a soft brass wire 0.25 mm in diameter subjected to a mechanical load of 1.3 daN and unwinding at a speed of 8 mm/min. The distance of the wire-guides 2 and 4 having been set at approximately 75 mm, the height difference between the linear abutments 7 and 8 is 40 mm. A series of increasing inclinations $\Delta UV$ were applied; the distances $D_1$ and $D_2$ computed according to the above formulae; the effective taper angle of the active portion of the wire is obtained using the following formula: Angle=(180/$\pi$). Arctan ($\Delta UV/D_2$)

| $\Delta UV$ [mm] | $D_1$ [mm] | $D_2$ [mm] | Angle [degrees] |
| --- | --- | --- | --- |
| 2.8 | 16.02 | 75.44 | 2.12 |
| 5.7 | 16.02 | 75.42 | 4.32 |
| 8.6 | 16.01 | 75.39 | 6.50 |
| 11.5 | 16.01 | 75.36 | 8.67 |
| 14.4 | 15.99 | 75.33 | 10.82 |

-continued

| $\Delta UV$ [mm] | $D_1$ [mm] | $D_2$ [mm] | Angle [degrees] |
| --- | --- | --- | --- |
| 17.4 | 15.96 | 75.25 | 13.01 |
| 20.4 | 15.87 | 75.06 | 15.20 |
| 23.5 | 15.78 | 74.88 | 17.42 |
| 26.6 | 15.69 | 74.72 | 19.59 |
| 29.9 | 15.62 | 74.53 | 21.85 |
| 33.2 | 15.55 | 74.35 | 24.06 |
| 36.7 | 15.44 | 74.12 | 26.34 |
| 40.3 | 15.33 | 73.93 | 28.59 |
| 44.1 | 15.16 | 73.69 | 30.89 |

In the method proposed above, the measurement device is extremely simple and quick to install. No perpendicularity is to be adjusted with the work table plane. The bases of the linear abutments may be attached anywhere on the bottom and top face of the rectified block. It is not even necessary for them to be parallel with one another because the only pertinent dimension in this set-up is the difference of height H between the two wire contact points. The set-up itself introduces as an uncertainty in the results just by the parallelism error of the rectified block.

During the operations described hereinabove, a wire is brought into contact with a linear abutment used as a reference. The wire and the linear abutment both being conductors of electricity, use is generally made of a device for detecting the interference, or the contact of the wire with the linear abutment. This sort of approach, known by those skilled in the art as an "electric touch" which detects a voltage or current threshold, instructs storage of the position reached and where necessary instructs immediate stoppage of the movement. The interference between a wire and any geometric reference may evidently be achieved by other known means available. For example, the metal linear abutment may be replaced by a sheet of light, a narrow beam of laser light, an optical line of sight, etc. In these cases, the stopping of the movement is optional and, in a more general sense, the intersection between a wire and a geometric reference contained in a plane XY will be detected.

To obtain a single pair of results, the wire does not have to be inclined in two opposite directions. This makes it possible to design devices and methods for distinguishing different pairs of pivot points ($W_1$, $W_2$) for one and the same inclination but in two opposite directions.

Figure 1:
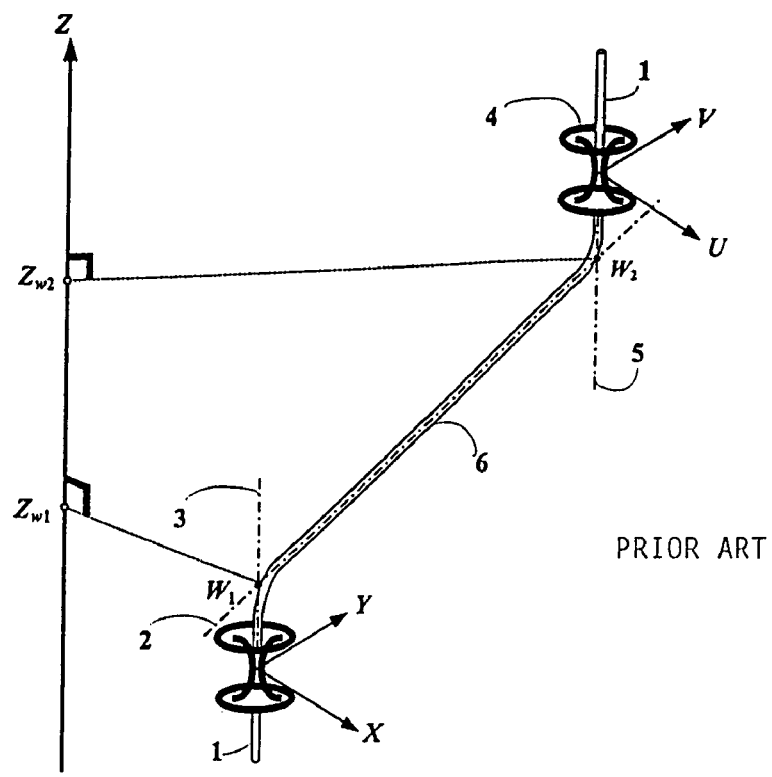
FIG. 1 is a schematic view in perspective of two guides of axial symmetry and used to machine with a sharply inclined wire whose rectilinear active portion is situated between two pivot points $W_1$, $W_2$.
Figure 2:
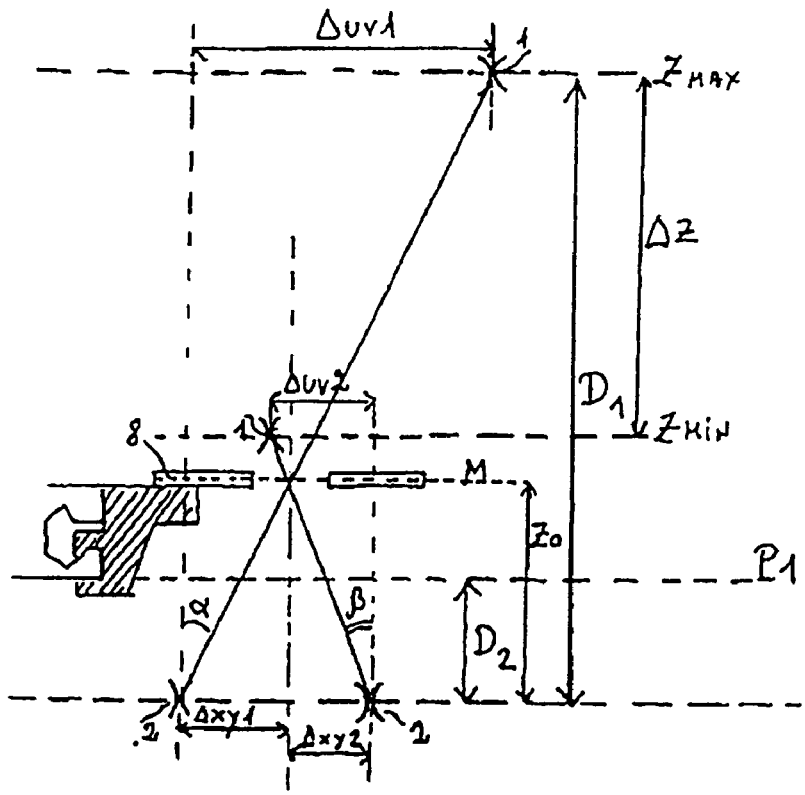
FIG. 2 illustrates a device of the prior art furnished with an eyepiece and used to carry out measurement cycles by inclining the wire in two opposite directions $\alpha$ and $\beta$.
Figure 3:
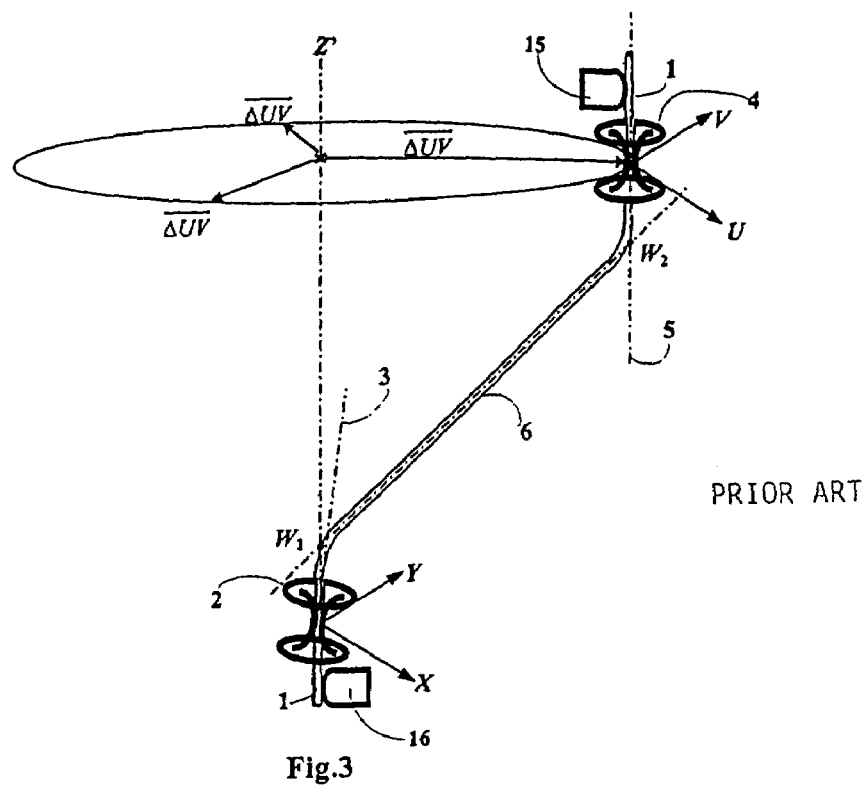
FIG. 3, similar to FIG. 1, shows the disadvantages that the invention proposes to correct; defects of axial symmetry of the guides; defect of verticality of the axis of the guides; influence of the machining contacts in the active portion of the wire.

Generally, the invention can be used to design, with reference to FIG. 3, devices for identifying the pair of pivot points ($W_1$, $W_2$) tied to an inclination vector $\overrightarrow{\Delta UV}$ of any orientation in the plane UV.

Figure 7:
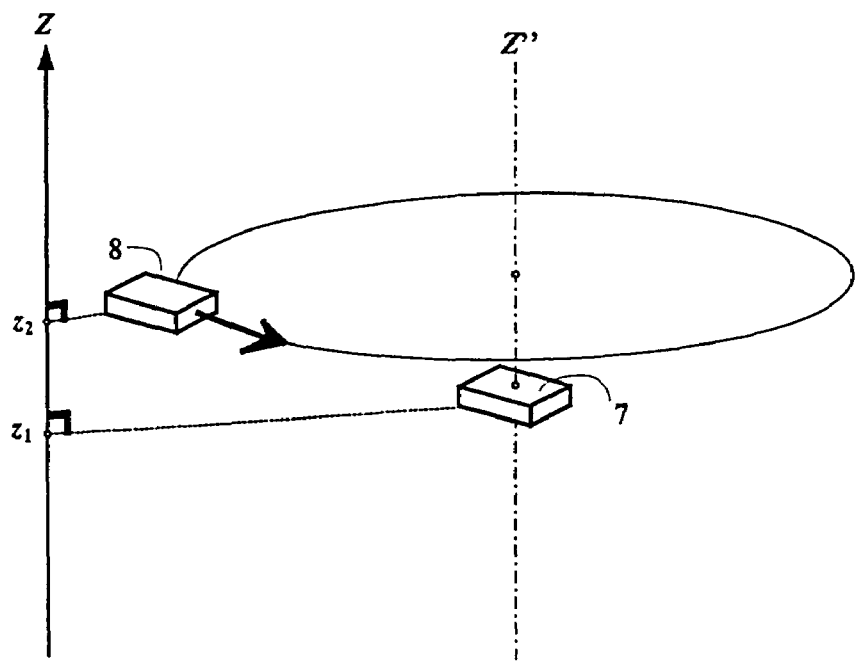
FIG. 7 is an imaginary representation in perspective of the geometric transformation used to go from the first device of the invention to a multidirectional measurement device.

FIG. 7 can be used to conceptualize such a multidirectional measurement device that constitutes a second embodiment of the invention. For this, imagine an axis Z" parallel to Z through one or other of the two rigid abutments 7 and 8. The axis Z" has for example been placed in FIG. 7 through the base supporting the bottom linear abutment 7. By rotating the top abutment 8 and the bottom abutment 7 about this axis Z" an axis-symmetric solid is generated similar to that represented in FIG. 8 in which two bi-dimensional bases 10 and 11 are depicted. The bottom base 10 is attached to the bottom face of the block 9 by means of an arm 12. The top base 11 in the shape of a ring is extended by a wide flat attachment 13 onto the top face of the block 9. The wire can be inserted into the device through a narrow opening 14. The latter opening is optional because the wire may also be inserted manually into the device or by an automatic threading cycle.

Figure 8:
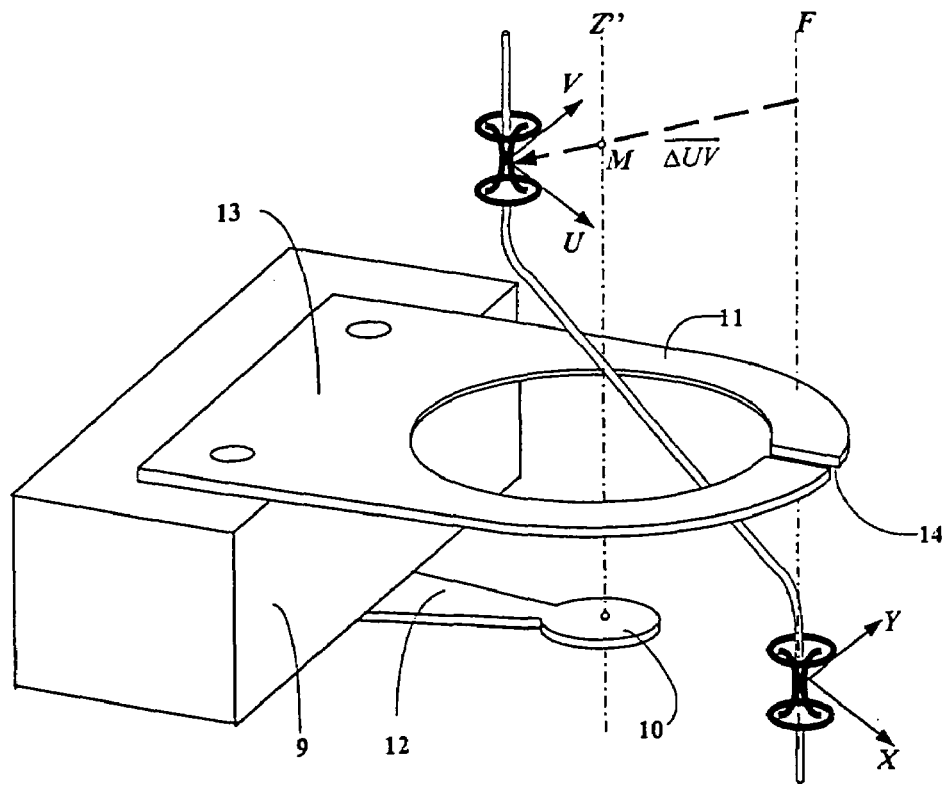
FIG. 8 illustrates the principle of a multidirectional device according to the invention used to take a measurement in any orientation $\overrightarrow{\Delta UV}$ in the UV plane.

It is clearly understood that FIG. 8 is a schematic diagram to explain the invention and that the base elements 10 and 11 must be made sufficiently rigid so that the two linear abutments still lie respectively in the planes of the parallel faces constituting the base 9 of the device.

To be able to execute the same sequence of movements as that represented in FIG. 6, it has to be arranged that, for any orientation, the inclination vector $\overrightarrow{\Delta UV}$ passes through a point M of the axis Z". It should be noted that the latter point M does not have to be defined with great accuracy, the aim being for the approaches to be made approximately perpendicularly to the linear abutments at plus or minus 15 degrees.

Note that the device chosen as an example in FIG. 8 comprises square sections serving as bases for the reference abutments, in other words that the beveled sections of the bases supporting abutments 7 and 8 seen in FIGS. 5 and 6 have disappeared. Such a simplification does not harm the accuracy of the results, because, if the steps of the sequence represented in FIG. 6 are followed, the approaches will be carried out either on the bottom ridge of the top base 11 or on the top ridge of the bottom base 10, therefore at altitudes $z_2$, $z_1$, which correspond respectively either to the top face or to the bottom face of the block 9.

The invention claimed is:

1. Device for measuring and adjusting a wire electrode used during electrical discharge taper machining, referenced on three axes, X and Y horizontal and Z vertical comprising the following elements:

two geometric references, bottom and top, which may be intersected by a wire, each of them lying in a plane XY, the said references being offset from one another in a direction XY by a sufficient distance to make it possible to insert a vertical electrode between the two without either of them being intersected by the wire, a base element serving as a support to the said references and as an attachment stay on a work bed of a machine, means for moving axes of the machine and for measuring their positions, means for detecting an interference between the wire electrode and top and bottom geometric references, a bottom wire-guide movable in a plane of coordinates XY, a top wire-guide movable in a plane of coordinates UV parallel to XY, and movable in a vertical direction Z perpendicular to the planes XY and UV, and further including a plane P defined by the axis of the wire set close to the vertical and by an inclination vector $\overrightarrow{\Delta UV}$ in a plane UV, and top and bottom geometric reference, each lying in a plane XY with two different heights ($z_1$, $z_2$) intersected by the wire successively and separately during a movement ($\overrightarrow{V}$) in the plane P, this movement capable of being made separately by one or simultaneously by the bottom and the top wire-guides, wherein, to measure the inclination of an electrode in all directions of a plane UV and wherein an axis-symmetric solid generated by the rotation about a vertical axis (Z") of top and bottom geometric references each of them lying in a plane XY with two different heights ($z_1$, $z_2$), means for placing the said axis close to one or other of these geometric references.

2. Device according to claim 1 further comprising:

a base element comprising two flat faces, bottom and top, parallel to the plane XY, one of which serves as an attachment stay on the work bed of the machine, and two linear abutments serving as geometric references which the wire can contact, the first linear abutment lying in the plane of the bottom face of the base and extending to the outside of the base, and the second linear abutment lying in the plane of the top face of the base element and extending likewise to the outside of the base element.

3. Device according to claim 1, wherein the wire is inclined at an angle of less than 5 degrees from the vertical and is inserted inside the said device without either of the two geometric references being intersected by the wire.

4. Method of measuring and adjusting an electrode in a device, for measuring and adjusting a wire electrode used during electrical discharge taper machining, referenced on three axes, X and Y horizontal and Z vertical comprising the following elements:

two geometric references, bottom and top, which may be intersected by a wire, each of them lying in a plane XY, the said references being offset from one another in a direction XY by a sufficient distance to make it possible to insert a vertical electrode between the two without either of them being intersected by the wire, a base element serving as a support to the said references and as an attachment stay on a work bed of a machine means for moving axes of the machine and for measuring their positions, means for detecting an interference between the wire electrode and top and bottom geometric references, a bottom wire-guide movable in a plane of coordinates XY, a top wire-guide movable in a plane of coordinates UV parallel to XY, and movable in a vertical direction Z perpendicular to the planes XY and UV, and further including a plane P defined by the axis of the wire set close to the vertical and by an inclination vector $\overrightarrow{\Delta UV}$ in a plane UV, and top and bottom geometric reference, each lying in a plane XY with two different heights ($z_1$, $z_2$) intersected by the wire successively and separately during a movement ($\overrightarrow{V}$) in the plane P, this movement capable of being made separately by one or simultaneously by the bottom and the top wire-guides, wherein, to measure the inclination of an electrode in all directions of a plane UV and wherein an axis-symmetric solid generated by the rotation about a vertical axis (Z") of top and bottom geometric references each of them lying in a plane XY with two different heights ($z_1$, $z_2$), means for placing the said axis close to one or other of these geometric references, the method comprises using an inclination vector $\overrightarrow{\Delta UV}$ in a plane UV which also passes through a point of the vertical axis (Z") to generate an axis-symmetric solid serving as a device for measuring in all the directions of the said plane UV.

5. Method of measuring and adjusting an electrode according to claim 4, wherein for a first vector $\overrightarrow{\Delta UV}$ of inclination of the wire the following sequence of operations are performed:

the wire close to the vertical is brought between top and bottom geometric references (7, 8), by a simultaneous movement of the guides, the wire is brought to interfere with the top reference (8), the position $xy_1$ reached is measured and stored, by a separate movement of the top guide, the wire is inclined towards the bottom reference (7) by making a movement $-\Delta UV$, by a simultaneous movement of the guides, the wire is brought back to interfere with the top reference (8), the position $xy_2$ reached is measured and stored, by a simultaneous movement of the guides, the wire is brought to interfere with the bottom reference (7), the position $xy_3$ reached is measured and stored, by a separate movement of the top guide, the wire is brought back to the vertical position by making a movement $+\Delta UV$, by a simultaneous movement of the guides, the wire is brought back to interfere with the bottom reference (7), the position $xy_4$ reached is measured and stored.

6. Method of measuring and adjusting an electrode according to claims 5 wherein, for a vector series $\overrightarrow{\Delta UV}$ of increasing inclination of the wire, the cyclical sequence of the following operations are performed:

by a simultaneous movement of the guides, the wire is brought to interfere with the top reference (8), by a separate movement of the top guide, the wire is inclined more sharply towards the bottom reference (7) by making a greater movement $-\Delta UV$ than the preceding one, by a simultaneous movement of the guides, the wire is brought back to interfere with the top reference (8), a new position $xy_2$ reached is measured and stored, by a simultaneous movement of the guides, the wire is brought to interfere with the bottom reference (7), a new position $xy_3$ reached is measured and stored, with each new cycle, the values $xy_1$ and $xy_4$ remaining unchanged for the computation of $D_1$ and $D_2$.

7. Method of measuring and adjusting an electrode according to claim 4, wherein for a first vector $\overrightarrow{\Delta UV}$ of inclination of the wire the following sequence of operations are performed:

the wire close to the vertical is brought between top and bottom references, by a simultaneous movement of the guides, the wire is brought to interfere with the bottom reference (7), the position $xy_1$ reached is measured and stored, by a separate movement of the top guide, the wire is inclined towards the top reference (8) by making a movement $+\Delta UV$, by a simultaneous movement of the guides, the wire is brought back to interfere with the bottom reference (7), the position $xy_2$ reached is measured and stored, by a simultaneous movement of the guides, the wire is brought to interfere with the top reference (8), the position $xy_3$ reached is measured and stored, by a separate movement of the top guide, the wire is brought back to the vertical position by making a movement $-\Delta UV$, by a simultaneous movement of the guides, the wire is brought back to interfere with the top reference (8), the position $xy_4$ reached is measured and stored.

8. Method of measuring and adjusting a wire electrode used during electrical discharge taper machining, according to claims 5 or 7, comprises computing on the one hand the height difference $D_1$ between the bottom pivot point ($W_1$) of the wire and the bottom reference (7), and on the other hand the height difference ($D_2$) between the two pivot points, bottom ($W_1$) and top ($W_2$), of the wire, $D_1$ and $D_2$ being functions of the inclination of the wire, using the following formulae:

$$D_1 = H \frac{\|xy_3 - xy_4\|}{\|xy_2 - xy_1\| - \|xy_3 - xy_4\|}$$

$$D_2 = \frac{(D_1 + H)\Delta UV}{\|xy_2 - xy_1\|}$$

wherein H is the height difference between top and bottom reference (7, 8).

9. Method of measuring and adjusting an electrode according to claims 7 wherein, for a vector series $\overrightarrow{\Delta UV}$ of increasing inclination of the wire, the cyclical sequence of the following operations are performed:

by a simultaneous movement of the guides, the wire is brought to interfere with the bottom reference (7), by a separate movement of the top guide, the wire is inclined more sharply towards the top reference (8) by making a greater movement $+\Delta UV$ than the preceding one, by a simultaneous movement of the guides, the wire is brought back to interfere with the bottom reference (7), a new position $xy_2$ reached is measured and stored, by a simultaneous movement of the guides, the wire is brought to interfere with the top reference (8), a new position $xy_3$ reached is measured and stored, with each new cycle, the values $xy_1$ and $xy_4$ remaining unchanged for the computation of $D_1$ and $D_2$.

* * * * *